United States Patent [19]

Fitzgerald

[11] Patent Number: 4,473,169
[45] Date of Patent: Sep. 25, 1984

[54] ANTI-THEFT PLUG AND FASTENER

[76] Inventor: Fitz E. Fitzgerald, 1226 NE. 150th St., North Miami, Fla. 33161

[21] Appl. No.: 351,249

[22] Filed: Feb. 22, 1982

[51] Int. Cl.³ .................... B65D 17/52; B65D 43/26
[52] U.S. Cl. .................................... 220/284; 220/288
[58] Field of Search ............................... 220/288, 284

[56] References Cited

U.S. PATENT DOCUMENTS 2,179,045 11/1939 Lewis ................................ 220/284
3,912,116 10/1975 Chahley ............................. 220/284

Primary Examiner—George T. Hall
Attorney, Agent, or Firm—Jack E. Dominik

[57] ABSTRACT

Disclosed are plugs and fasteners which deter unauthorized removal through the use of rotationally symmetric engagement recesses. The invention also provides special tools with projections complementary to the plug and fastener recesses and thereby permit easy removal of the plugs and fasteners without damage. An exemplary embodiment of an inventive plug contains a two-stage recess in lieu of the standard hexagonal head; each of the recess stages is rotationally symmetric, and the two stages have non-coinciding symmetry axes. The rotational symmetry of the recess stages defeats any attempt to remove an inserted plug by forcing commonly available tools, such as hex or square drivers and blade or Phillips screwdrivers, into the recess. An inventive tool for use with this embodiment has a two-stage projection complementary to the recess.

3 Claims, 9 Drawing Figures

ANTI-THEFT PLUG AND FASTENER

BACKGROUND OF THE INVENTION

1. Field of the Invention

The present invention relates generally to plugs and fasteners and, more particularly, to plugs and fasteners requiring a special tool for easy removal without damage.

2. Description of the Prior Art

Tank drain plugs, such as are found on gasoline tanks of trucks and stationary storage tanks, are generally insertable and removable by use of standard tools such as wrenches. However, the increases in petroleum prices have made theft by removing the drain plug and draining a tank of its contents a not uncommon occurrence. Thus it is a problem to deter theft by use of a tank drain plug which cannot be easily removed with commonly available tools, which is of rugged, durable, and inexpensive construction, and which may be easily inserted and removed without damage with a proper tool.

Frequently fasteners, such as are used to assemble partitions in lavatories, are desirably not easily removed, and use of the one-way ramp head screw is common. But, such a screw cannot be easily removed, short of drilling, even with special tools. Thus it is a problem to provide fasteners which may be easily removed only with special tools and without damage to the fastener.

SUMMARY OF THE INVENTION

The present invention provides plugs and fasteners which deter unauthorized through the use of rotationally symmetric engagement recesses. The invention also provides special tools with projections complementary to the plug and fastener recesses and thereby permit easy removal of the plugs and fasteners without damage. An exemplary embodiment of an inventive plug contains a two-stage recess in lieu of the standard hexagonal head; each of the recess stages is rotationally symmetric, and the two stages have non-coinciding symmetry axes. The rotational symmetry of the recess stages defeats any attempt to remove an inserted plug by forcing commonly available tools, such as hex or square drivers and blade or Phillips screwdrivers, into the recess. An inventive tool for use with this embodiment has a two-stage projection complementary to the recess.

DESCRIPTION OF PREFERRED EMBODIMENTS

1. First Embodiment

Figure 1:
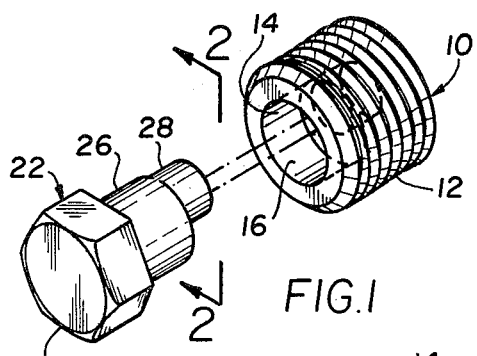
FIG. 1 is a perspective view of the first embodiment of the plug and an complementary tool.
Figure 2:
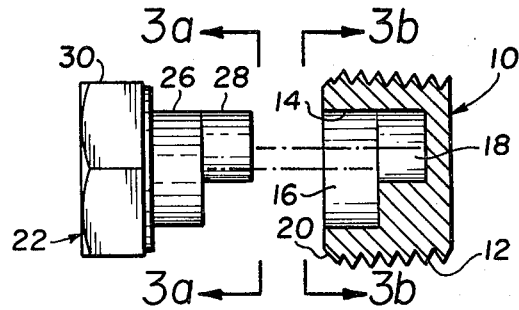
FIG. 2 is a sectional view of the plug and tool taken along line 2—2 of FIG. 1.
Figure 3A:
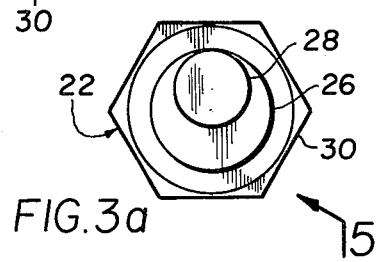
FIG. 3a is an end view of the tool taken from line 3a—3a of FIG. 2.
Figure 3B:
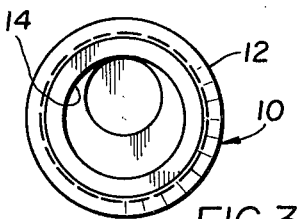
FIG. 3b is an end view of the plug taken from line 3b—3b of FIG. 2.

Referring simultaneously to FIGS. 1, 2 and 3, the plug 10 is seen to include the standard slightly tapered body with external screw threading 12 which engages the complementary threadings in a tank drain opening. The tapering is such that the end of the plug entering the tank upon insertion of the plug (the right-hand end in FIG. 2) has a slightly smaller diameter than the opposite end so that upon insertion the plug essentially wedges into the threaded drain opening. An untapered plug which would advance without impediment to be completely inside of the tank without ever forming a fluid tight seal. Plug 10 contains recess 14 which comprises a large right circular cylinder 16 and connecting smaller right circular cylinder 18. The central axes of cylinders 16 and 18 are parallel but not coincident.

After insertion, the face of plug 10 external to the tank (the left-hand end in FIG. 2) is ideally either flush with or slightly recessed into the adjacent face of the tank; however, variability of plugs and tanks may result in a plug 10 which, upon insertion into a tank, has its external face projecting slightly from the adjacent face of the tank. To minimize the possibility of this projecting portion of the plug being grasped by a tool, such as a pair of pliers, the external face has a chamfer 20.

Plug 10 is inserted and removed by use of tool 22 as will be explained.

Tool 22 includes right circular cylindrical projections 26 and 28 which are complementary to recess cylinders 16 and 18, respectively, and also includes a standard hexagonal cap 30 which may be engaged by a standard wrench to supply torque to tool 22 for insertion or removal of plug 10. To remove plug 10 from a tank, first tool 22 is manually pressed into plug 10 so that projecting cylinders 26 and 28 fit into recess cylinders 16 and 18, respectively. At this point cap 30 will be external to but approximately flush with the face of the tank and plug 10 and will be hidden from external view; in short, the combination of plug 10 and tool 22 appears to be and may be treated like a standard hex head plug. Then a standard wrench is used to engage cap 30 and rotate and remove the combination. Lastly, tool 22 and plug 10 are manually separated. Insertion of plug 10 is just the reverse of removal.

The rotational symmetry of cylinders 16 and 18 defeats removal of plug 10 by the use of tools, such as screwdrivers, forced into recess 14 instead of by use of tool 22 or some equivalent tool containing complementary projections such as projections 26 and 28. In contrast, a screwdriver of appropriate blade size may be forced into a standard hex or square socket plug and used to remove such a plug because the non-rotational symmetry of a hex or square socket prevents the screwdriver blade from slipping around in the socket.

Plug 10 is made of the same materials as standard plugs are and may be galvanized, etc. For a standard ½ inch N.P.T. plug appropriate dimensions of plug 10 would be as follows:

| | |
|---|---|
| axial length of plug 10 | 0.562 inches |
| diameter of plug 10 | 0.710 inches |
| length of cylinder 16 | 0.234 inches |
| diameter of cylinder 16 | 0.506 inches |
| length of cylinder 18 | 0.234 inches |

| -continued | |
|---|---|
| diameter of cylinder 18 | 0.319 inches |

2. Second Embodiment

Figure 4:
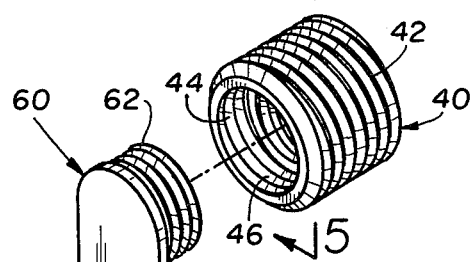
FIG. 4 is a perspective view of the second embodiment of the plug and complementary tool.
Figure 5:
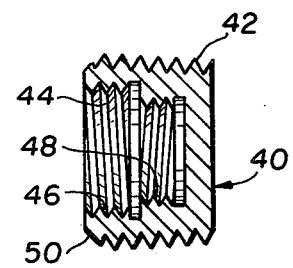
FIG. 5 is a sectional view through line 5—5 of FIG. 4.

Referring simultaneously to FIGS. 4 and 5, it is seen that plug 40 includes the standard tapered body with external screw threading 42 for engagement with the complementary threading of a tank drain hole. Plug 40 contains recess 44 comprising a first threaded right circular cylinder 46 and a second adjoining smaller diameter, coaxial, threaded right circular cylinder 48. The threading in cylinder 48 is right-handed and is used for insertion of plug 40 into a threaded tank drain hole (presumed to be right-handed threaded); whereas the threading of cylinder 46 is left-handed and is used for removal of plug 40. The external face of plug 40 (left-hand side in FIG. 5) contains chamfer 50 to help defeat grasping of plug 40 by tools such as pliers if, upon installation in a tank, the exterior face of plug 40 projects from the adjacent face of the tank.

The insertion and removal of plug 40 may be accomplished by use of tool 60, as will be explained.

Tool 60 comprises a convenient combination of a left-handed threaded stud 62 and a right-handed threaded stud 64 with stud 62 complementary to cylinder 46 and stud 64 complementary to cylinder 48. Thus tool 60 may act as a wrench for removal of plug 40 from a tank by first screwing (left-handedly) stud 62 completely into recess cylinder 46, the body of tool 60 acting as a handle. After stud 62 has reached its limit of penetration into cylinder 46, further left-handed turning of tool 62 will unscrew and remove plug 40. Lastly, plug 40 is unscrewed from stud 62. Insertion of plug 40 is just the reverse of removal, but with use of stud 64 and cylinder 48.

Alternative forms of tool 60 are clear: a threaded stud complementary to cylinder 46 with a standard hexagonal cap and a separate threaded stud complementary to cylinder 48 with a standard hexagonal cap could be used in conjunction with standard wrenches for engaging the caps.

The rotational symmetry of cylinder 46 and cylinder 48 defeats the use of commonly available tools such as screwdrivers and socket wrenches for removal of plug 40.

3. Third Embodiment

Figure 6:
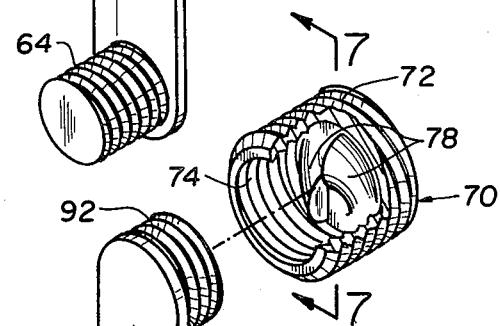
FIG. 6 is a perspective view of the third embodiment of the plug and complementary tool.
Figure 7:
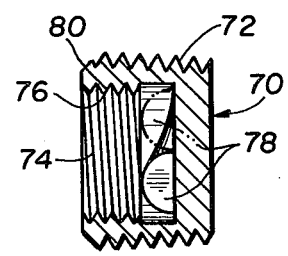
FIG. 7 is a sectional view through line 7—7 of FIG. 6.
Figure 8:
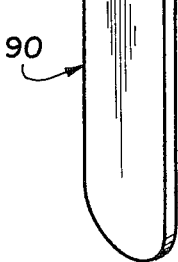
FIG. 8 is an end view of the plug of FIG. 6.
Figure 8:
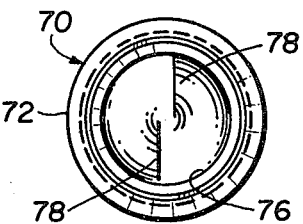

Referring simultaneously to FIGS. 6, 7 and 8, it is seen that plug 70 includes the standard tapered body with external screw threading 72 for engagement with the complementary threading of a tank drain hole. Plug 70 contains recess 74 comprising a threaded right circular cylinder 76 and a one-way ramp screw head 78. The one-way ramp screw head 78 is used for insertion of plug 70 into a threaded tank drain hole by means of a screwdriver; whereas the threading of cylinder 76 is left-handed and is used for removal of plug 70. The external face of plug 70 (left-hand side in FIG. 7) contains chamfer 80 to help defeat grasping of plug 70 by tools such as pliers if, upon installation in a tank, the exterior face of plug 70 projects from the adjoining face of the tank.

Tool 90 comprises a left-handed threaded stud 92 complementary to cylinder 76 and thus may act as a wrench for removal of plug 70 in the same manner as stud 62 on tool 60 is used to remove plug 40.

The rotational symmetry of cylinder 76 and the one-way ramp of head 78 defeat the use of commonly available tools such as screwdrivers and Allen wrenches for removal of plug 70.

4. Other Embodiments

Each of the three preceding embodiments was illustrated as a tank drain plug, but each may be adapted to plugs and fasteners in general (bolts, screws, bayonet couplings, etc.) which are removed by rotation and for which removal deterence is desired. The adaptation is immediate: for example, the head of a screw could have the slot for engaging a screwdriver blade replaced by two stage recess 14, as described in the first embodiment, and the screwdriver would be replaced by tool 22 and a wrench. Such embodiments are not illustrated.

Although particular embodiments of the invention have been shown and described in full here, there is no intention to thereby limit the invention to the details of such embodiments. On the contrary, the intention is to cover all modifications, alternatives, embodiments, usages and equivalents of the subject invention as fall within the spirit and scope of the invention, specification, and the appended claims.

What is claimed is:

1. A plug for removably plugging an opening, comprising:
   (a) a body containing essentially a single recess,
   (b) means on the surface of said body for engaging said opening by rotation of said body,
   (c) said recess consisting essentially of one or more substantially rotationally symmetric and connected regions,
wherein said recess comprises a first region connected to a second region, said first and second regions both substantially right circular cylinders with:
   (1) the diameter of said first region greater than the diameter of said second region,
   (2) the central axes of said first and second regions substantially parallel but not coincident,
   (3) a first end face of said first region being imaginary and bordering the surface of said body, and
   (4) the other end face of said first region being partially imaginary and containing an imaginary end face of said second region.

2. A plug for removably plugging an opening, comprising:
   (a) a body containing essentially a single recess,
   (b) means on the surface of said body for engaging said opening by rotation of said body,
   (c) said recess consisting essentially of one or more substantially rotationally symmetric and connected regions,
wherein said recess comprises a first region connected to a second region, said first and second regions both substantially right circular cylinders with screw threadings on a portion of each of the cylindrical faces and so that:
   (1) the diameter of said first region exceeds the diameter of said second region,
   (2) one of said region threadings is right-handed and the other of said region threadings is left-handed,
   (3) a first end face of said first region being imaginary and bordering the surface of said body, and
   (4) the other end face of said first region being partially imaginary and containing an imaginary end face of said second region.

3. A plug for removably plugging an opening, comprising:
   (a) a body containing essentially a single recess, (b) means on the surface of said body for engaging said opening by rotation of said body,
(c) said recess consisting essentially of one or more substantially rotationally symmetric and connected regions, wherein said recess comprises a substantially right circular cylinder region with screw threading on a portion of the cylindrical face and with:
  (1) a first end face of said region being imaginary and bordering the surface of said body, and
  (2) the other end face of said region forming a one-way ramp screw head.

* * * * *